United States Patent Office 3,425,251
Patented Feb. 4, 1969

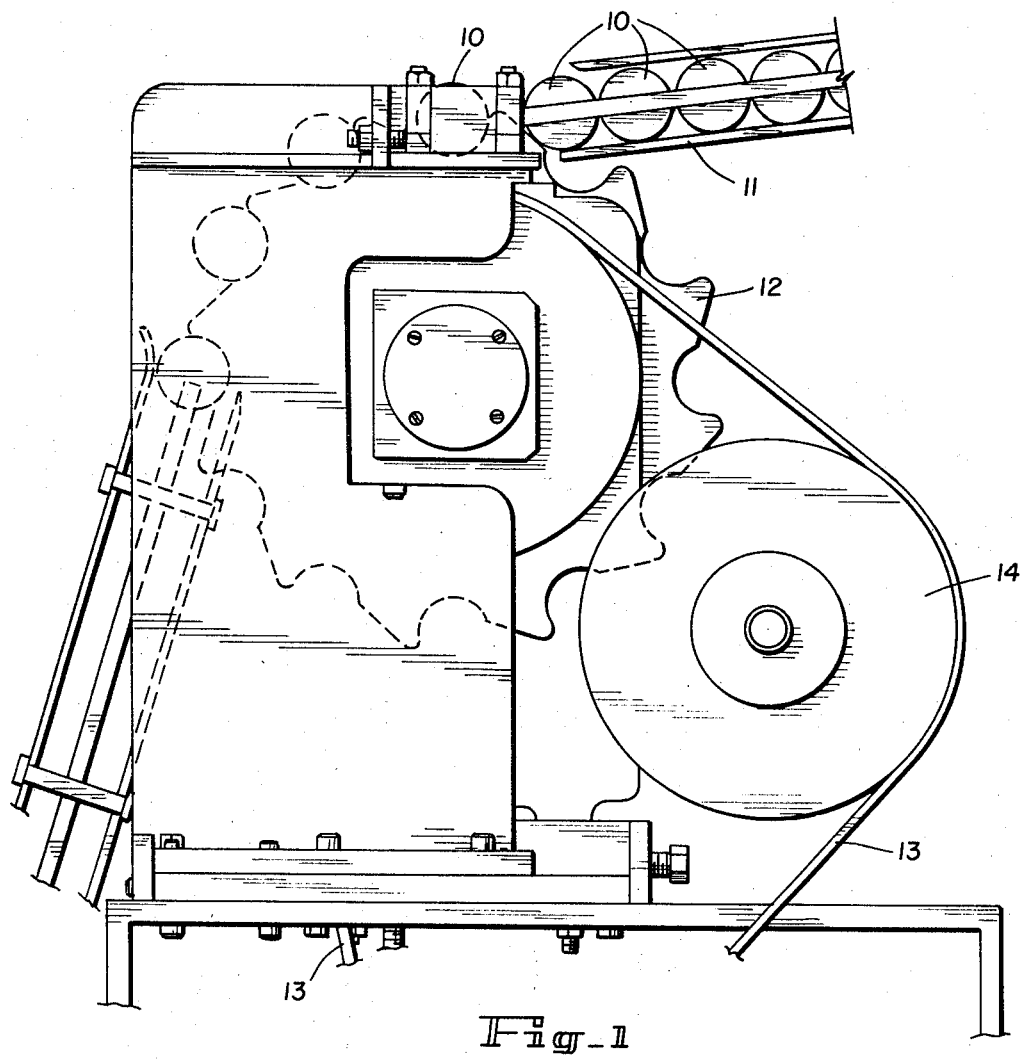
Fig_1
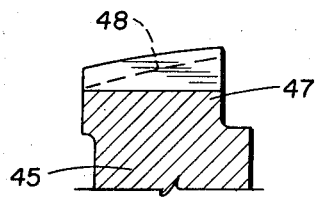
Fig_6
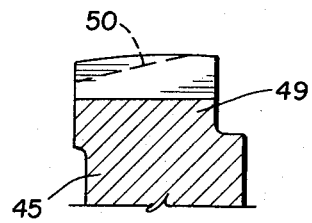
Fig_7
INVENTOR.
JOHN HARDY MAYTAG
BY
Bertha L. MacGregor
ATTORNEY

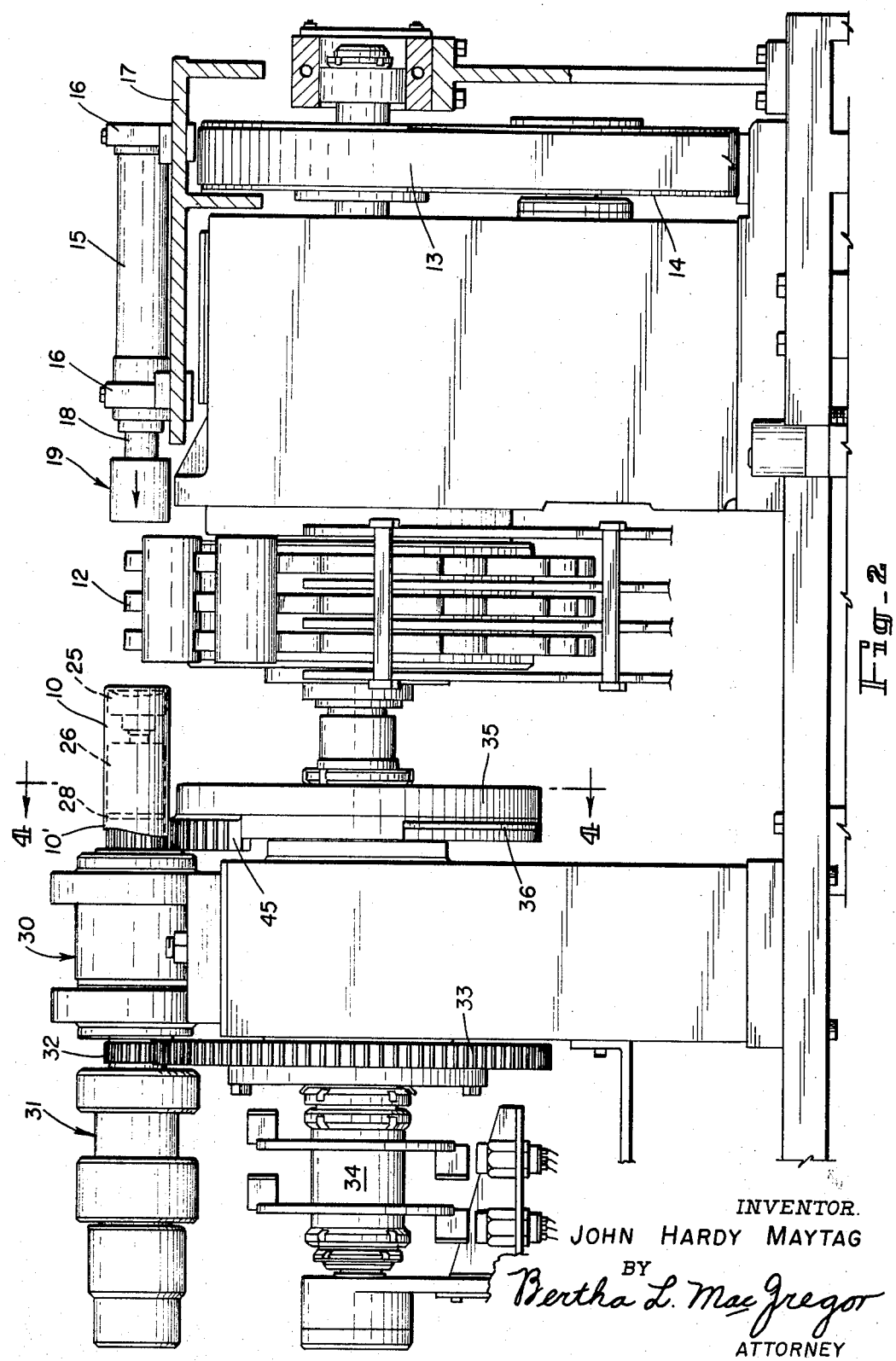

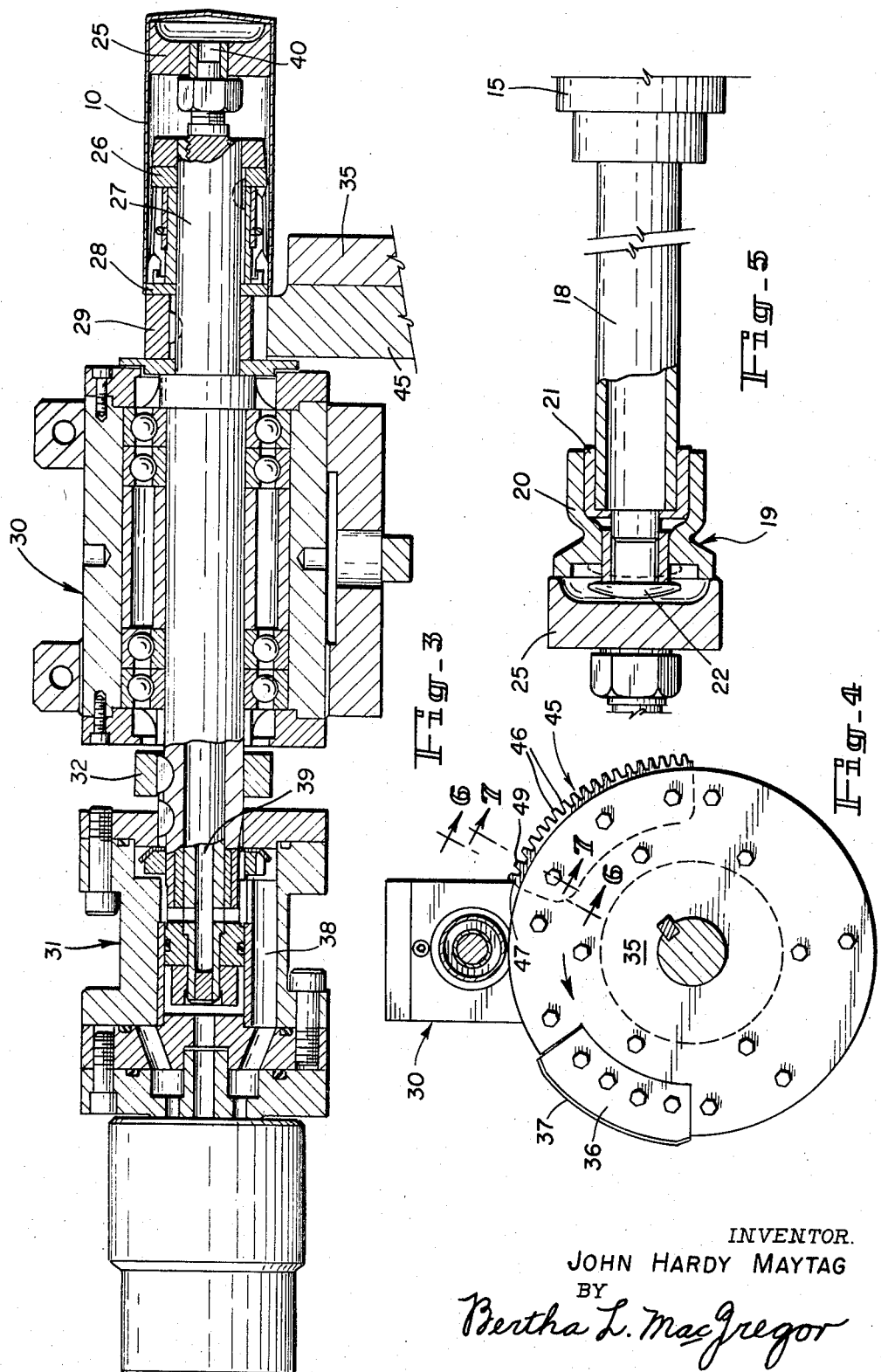

3,425,251
CAN TRIMMER AND SCRAP DISPOSING MECHANISM
John Hardy Maytag, Denver, Colo., assignor to Coors Porcelain Company, Golden, Colo., a corporation of Colorado
Filed July 18, 1966, Ser. No. 570,114
U.S. Cl. 72—71    16 Claims
Int. Cl. B23d *5/12;* B21d *43/28, 51/26*

ABSTRACT OF THE DISCLOSURE

A can trimmer and scrap disposing mechanism which comprises means for trimming the can body by cutting it circumferentially to predetermined length and forming an endless scrap ring, and means for tearing or severing the ring transversely and corrugating the severed ring to form ridges and grooves which extend transversely of the scrap strip and parallel to the axis of the can body. The trimming of the can body is done by cooperating cutting blades, one of the blades being a cutter sector on a rotated tool carrying wheel. The severing of the scrap ring and the corrugation of the scrap strip are done by cooperating knurl devices, one of which is a toothed sector mounted on the tool carrying wheel and circumferentially spaced thereon from the cutter sector. This construction obviates possibility of damage to the can body which results when the can body is slit longitudinally before the can body is trimmed to predetermined length.

---

This invention relates to a can trimmer and scrap disposing mechanism. The mechanism shown herein is adapted for handling closed bottom, open top cans for the purpose of trimming the cylindrical bodies thereof to predetermined lengths.

The main object of the invention is to provide dependable can trimming mechanism and to dispose of the scrap trimmed off the cans in such manner that the scrap will fall away from the trimmer mechanism quickly after it becomes separated from the can, and thus avoid interfering with the speedy performance of subsequent trimming operations on cans successively moved into trimming positions. During the trimming operation, each can is supported on a work rest and collapsible mandrel concentric with an adjacent to an upper cutter, which is adjacent on its other side to a scrap knurling or corrugating roller. When the excess material has been cut from the can body, the scrap is in the form of an endless ring which then surrounds the periphery of the cutter. If the scrap rings are not removed quickly after each can has been trimmed, they collect on the cutter and knurling roller and become compacted thereon in an immovable mass which results in interrupting the operation of the machine.

Therefore it is essential that the scrap rings be severed transversely after having been sheared from the cylindrical bodies of the cans, and then fall away quickly from the trimmer mechanism.

A further object of the invention is to convert the transversely severed rings from their round configuration to longitudinally extending straight form before they fall away from the trimmer mechanism. This change in configuration of the scrap rings results in substantial saving of space in scrap storage containers, prevents scrap linking into chains, and also facilitates the speedy removal of the scrap from the machine after each can trimming step.

Another object of the invention is to provide scrap ring knurling or corrugating means including a sector provided with teeth, one or more of the teeth being specially formed to tear or break the scrap ring at the beginning of the crimping or corrugating operation, promptly after the ring has been cut from the can.

The advantages of the invention will be apparent from the drawings and following description of the machine.

In the drawings:

FIG. 1 is an end elevational view of a can trimmer and scrap disposing mechanism embodying my invention, partly broken away.

FIG. 2 is an elevational side view, partly in section, of the machine of FIG. 1.

FIG. 3 is a longitudinal vertical sectional view (from left to right) of the cylinder head, spindle sub-assembly, scrap knurling wheel, upper cutter, mandrel and work rest, with part of the tool carrier (lower cutter and crimper means) broken away.

FIG. 4 is a transverse vertical sectional view in the plane of the line 4—4 of FIG. 2, showing the mandrel in section and the tool carrier with cutter and crimper sectors thereon in elevation.

FIG. 5 is a longitudinal vertical sectional view partly in elevation, of the can loader assembly.

FIG. 6 is a transverse sectional view in the plane of the line 6—6 of FIG. 4, of the first tooth of the knurling sector on the tool carrier wheel.

FIG. 7 is a transverse sectional view in the plane of the line 7—7 of FIG. 4, of the second tooth of the knurling sector on the tool carrier wheel.

In that embodiment of the invention shown in the drawings, a can 10 drops from a supply chute or conveyor 11 into a pocket of the star wheel 12 while the wheel is at rest. A gate (not shown) prevents dropping of cans while the star wheel is in motion. The star wheel timing belt 13 and timing belt sprocket 14 may be actuated by any suitable mechanism, such as shown for example in FIG. 1, and need not be described in detail. The star wheel 12 indexes to bring a can 10 into concentric alignment with the spindle assembly and associated parts to be described hereinafter.

As best shown in FIGS. 2 and 5, the can loading mechanism comprises a pneumatic piston rod cylinder 15 mounted by suitable means 16 on a support 17. A piston rod 18 is reciprocable in the cylinder 15. The rod 18 has mounted on its outer end a can loader 19, shown diagrammatically in FIG. 2. The loader 19 comprises a loader swivel 20 and loader journal 21. The swivel is retained by the retaining screw 22, as shown in FIG. 5.

The loader 19 is concentric with the can receiving mandrel 26 and work rest 25 shown in FIGS. 2 and 4. The loader 19 when moved into extended position by piston rod 18, pushes a can 10 from the star wheel 12 onto the work rest 25 and collapsible mandrel 26 on spindle 27. The body of the can 10 adjacent its open end extends over the cutter member 28, the latter being located adjacent the scrap knurl roller 29. The loader swivel 20 bears against the bottom of the can on the work rest 25, being urged by compressed air supplied through the piston rod 18 while the piston travels to the forward limit of its stroke.

The spindle 27 is rotatably mounted in suitable bearings in a spindle sub-assembly 30, and in the pneumatic cylinder 31. Between the parts 30 and 31, a drive pinion 32 is operatively connected by gear 33 to a shaft 34 on which is mounted a tool carrier wheel 35. A knife sector 36 is fixedly mounted on the tool carrier wheel 35. The face of the knife sector is coplanar with and its peripheral edge 37 is tangent to that of the upper knife 28. The cutter edge 37 revolves past the knife 28 and shears the excess material 10' from the cylindrical body of the cam 10. The axis of the knife 28 is angularly adjustable to that of the tool carrier wheel 35, and the mandrel 26 is sufficiently flexible to permit deflecting of the cam inwardly to admit the knife edge 37.

Compressed air from any suitable source passes through passageways 38 and 39 in cylinder 31 and through the spindle subassembly 30 to the stripper nozzle 40 in the work rest 25. When the compressed air supporting the work rest 25 is discharged, the loader swivel 20 is enabled to push the trimmed can over the upper knife 28, causing the scrap to be pushed in axial direction onto the scrap knurl roller 29. The spindle shaft 27 and mandrel 26 as well as the tool carrier shaft 34 and wheel 35 are constantly rotating, at such a ratio that the peripheral velocities of the upper knife 28 and knife sector 36 are approximately equal.

Compressed air is discharged from the blind end of the loader cylinder 15, thereby allowing the piston rod 18 to retract. Compressed air is discharged through the stripper nozzle 40, causing the can to follow the retracting piston rod 18 of the loader cylinder 15 until the can is replaced in the pocket of the star wheel 12.

The described movement of the trimmed can on the work rest 25, to push the scrap 10' (FIG. 2) onto the scrap knurl roller 29, followed by movement in opposite direction wherein the trimmed can 10 follows the withdrawing piston rod 18 of the loader 15 until the can is replaced in the star wheel pocket, take place while the tool carrier wheel 35 is rotating the circumferential distance from the cutter sector 36 past the scrap knurling sector 45 mounted on the carrier wheel 35, as shown in FIG. 4. After the cutter 36 has severed the scrap 10' from the can 10, and the scrap pushed on the knurl roller 29, the scrap knurl sector 45 rotates into engagement with the scrap knurl roller 29. As is apparent from FIG. 4, the cutter blade 36 is spaced circumferentially from the knurl sector 45 on the wheel 35, so that the can trimming step takes place first by cutting the scrap from the can in the form of an endless ring, and after the scrap ring has been pushed onto the knurl roller 29, the knurl sector 45 engages the scrap ring on the roller 29. The cutting and knurling cannot occur simultaneously. The teeth 46 on sector 45 extend parallel to the shaft 34 and axis of the tool wheel 35, and therefore the ridges and grooves of the corrugations formed in the scrap by the knurling operation extend transversely of the scrap and parallel to the axes of the knurl roller 29 and tool wheel 35. Thus, no matter how narrow the scrap ring may be, it is knurled by transversely extending ridges and grooves across its entire width. Since the shaft carrying the roller 29 and the shaft 34 carrying the tool wheel 35 are connected by gearing, the teeth of the roller 29 and those of the sector 45 cannot interfere with each other. The scrap 10' fits the outside diameter of the roller 29 quite closely, and therefore initial engagement of the teeth 46 of knurl sector with the teeth on the roller causes the scrap to break or tear. Further engagement of the knurl sector 45 with the roller 29 shapes the scrap (originally in the form of a continuous ring) into an approximately straight corrugated strip which falls away from the trimmer and can be handled and stored economically and conveniently.

The tearing or breaking of the scrap ring 10' promptly after it has been engaged by the toothed knurl sector 45 is facilitated and ensured by making the first and second teeth of the knurl sector 45 of special form as shown in FIGS. 6 and 7. The first tooth 47 has a beveled upper surface 48 which is inclined transversely of the tool carrier wheel 35, as shown in FIG. 6. The second tooth 49 has a beveled upper surface 50 which is inclined transversely of the tool carrier wheel 35 as shown in FIG. 7. This special configuration of the first and second teeth improves the consistency of the breaking or tearing of the scrap ring at the beginning of the engagement between the knurling sector 45 and the knurl roller 29. Helically disposed teeth on the knurl roller and scrap knurl sector may be substituted for the axially disposed arrangement of the teeth shown herein.

After the sector 45 has rotated past the roller 29, air is admitted to the work rest cylinder 31, and the work rest 25 is returned to its working position for repetition of the described cycle of operations.

Briefly summarizing the operation of the machine: Can 10 drops into pocket of star wheel 12 while wheel is at rest; star wheel indexes, bringing can into concentric alignment with spindle assembly 30; piston rod 18 carrying loader 19 extends to push can over work rest 25, mandrel 26 and upper knife 28, with bottom of can supported by work rest which is supported by the pneumatic cylinder 31. Loader swivel 20 bears against bottom of can and is urged toward it by compressed air supplied through piston rod 18 while piston rod continues to travel to the forward limit of its stroke.

Knife sector 36 on tool carrier 35 revolves past upper knife 28, shearing the excess scrap material 10' from the can. Compressed air supporting the work rest 25 is discharged, permitting the loader swivel 20 to push the can over the upper knife 28, thereby causing the scrap 10' to be pushed beyond the upper knife and on the scrap knurl roller 29. Compressed air is discharged from the blind end of the loader cylinder 15, allowing piston rod to retract.

Compressed air is discharged from the work rest cylinder 31 through the work rest 25, causing the can to follow the retracting piston rod 18 until the can is replaced in the star wheel pocket. Meanwhile, the scrap knurl sector 45 moves into engagement with the scrap knurl roller 29, shears the scrap ring 10' transversely as the first one or two teeth, 47, 49, contact the scrap, followed by straightening of the scrap ring into corrugated strip form by the teeth 46 and knurled roller 29, and falling away of the scrap from the machine.

In describing the invention, reference has been made to a particular example embodying the same, but I wish it to be understood that the invention is not limited to the construction shown in the drawings and that changes may be made in the construction and general arrangement of parts without departing from the invention as defined in the appended claims.

The operation of pushing the scrap off the knife and on to the scrap knurl roller is necessitated by the requirement that the scrap be sheared from the can in such manner that the sharp edge resulting from the operation will appear on the outside rather than the inside of the can, in order to facilitate subsequent operations on the can. In cases where it would be permissible to shear off the scrap in the opposite direction, i.e. with the sharp edge on the inside, the axial positions of the knife and knife sector would be reversed, and the scrap would surround the scrap knurl roller before trimming from the can, and would be in position for breaking and corrugating as soon as sheared. A collapsible mandrel for holding the can would not be required in this case, but the scrap knurl roller would have to be slightly modified to permit the knife sector to deflect the scrap inward sufficiently to shear it from the can.

I claim:

1. Can trimmer and scrap disposing mechanism comprising
   (a) can supporting means,
   (b) a cutter adjacent one end of the supporting means,
   (c) a knurl roller adjacent the cutter,
   (d) a first rotated shaft on which the supporting means, cutter and roller are co-axially mounted,
   (e) a second rotated shaft substantially parallel to the first shaft,
   (f) a tool carrying, rotated wheel mounted on the second shaft,
   (g) a cutter blade sector mounted on the rotated tool carrying wheel to cooperate with the cutter on the first shaft to trim cans to predetermined length and shear scrap from cans in the form of endless rings surrounding the knurl roller, and
   (h) a knurling sector mounted on the tool carrying wheel and spaced circumferentially from the cutter blade sector to cooperate with the knurl roller to sever the scrap rings transversely after the cutter blade sector has sheared the scrap from the cans and straighten the severed rings into knurled strips which fall away from the trimmer and knurling mechanism.

2. The mechanism defined by claim 1, which includes means for pushing the endless scrap rings from the cutter to the knurl roller.

3. The mechanism defined by claim 1, in which the knurling sector on the tool carrying wheel has teeth which extend parallel to the axis of the wheel and in cooperation with the knurl roller form knurl ridges and grooves extending transversely of the severed scrap ring.

4. The mechanism defined by claim 1, in which the knurling sector is provided with a plurality of teeth adapted to engage the knurl roller.

5. The mechanism defined by claim 4, in which the teeth include a first tooth having a beveled edge inclined transversely of the tool carrying wheel and adapted to tear the scrap ring when the knurling sector engages the knurl roller.

6. The mechanism defined by claim 1, in which the knurling sector and the cutter blade sector on the tool carrying wheel are offset relatively to each other axially of the tool carrying wheel.

7. Can trimmer and scrap disposing mechanism comprising
   (a) a can supporting work rest and collapsible mandrel,
   (b) a rotary cutter adjacent the mandrel,
   (c) a knurl roller adjacent the cutter,
   (d) a pneumatic cylinder,
   (e) a first rotated shaft on which the cylinder is mounted, said mandrel, cutter and knurl roller being mounted on the shaft with the work rest in communication with the pneumatic cylinder,
   (f) a second rotated shaft substantially parallel to the first shaft,
   (g) gearing operatively connecting said first and second shafts,
   (h) a tool carrying wheel mounted on the second shaft,
   (i) a cutter blade sector mounted on the tool carrying wheel to cooperate with the cutter on the first shaft to trim cans to predetermined length and shear scrap from cans in the form of endless rings surrounding the knurl roller, and
   (j) a knurling sector mounted on the tool carrying wheel and spaced circumferentially from the cutter blade sector to cooperate with the knurl roller to sever the scrap rings transversely after the cutter blade sector has sheared the scrap from the cans and straighten the severed rings into knurled strips which fall away from the trimmer and knurling mechanism.

8. The mechanism defined by claim 7 which includes pneumatically controlled can loading means concentric with the work rest and mandrel, and a star wheel having pockets holding cans between said loading means and work rest in axial alignment for axial movement of the cans into the work rest and mandrel by the loading means.

9. The mechanism defined by claim 8, in which the star wheel is mounted concentrically with the tool carrying wheel shaft.

10. The mechanism defined by claim 8, in which the loading means comprises a piston rod, a swivel member rotatable on the end of the rod, means holding the swivel on the rod, and pneumatic cylinder in which the piston rod is mounted for axial reciprocation toward and from the can work rest across the star wheel pockets.

11. The mechanism defined by claim 7, in which the cutter blade sector and the knurling sector are circumferentially spaced apart on the tool carrying wheel to provide time between the trimming and scrap knurling operations for the scrap to be moved into the knurl roller and the trimmed can to be withdrawn sufficiently to clear the scrap knurl sector.

12. The mechanism defined by claim 7, which includes means for pushing the trimmed can and scrap toward the knurl roller and means for withdrawing the trimmed can from the mandrel and work rest.

13. The mechanism defined by claim 7, in which the knurling sector is provided with a plurality of teeth, including a first tooth having a beveled edge inclined transversely of the tool carrying wheel and adapted to tear the scrap ring when the knurling sector engages the knurl roller.

14. The mechanism defined by claim 7, in which the knurling sector on the wheel carrying tool has teeth which extend parallel to the axis of the wheel and in cooperation with the knurl roller form knurl ridges and grooves extending transversely of the severed scrap ring.

15. A can trimmer and scrap disposing mechanism which comprises
   (a) a rotated tool carrying wheel,
   (b) a can holder axially parallel to the axis of the tool carrying wheel,
   (c) means for trimming the can body by cutting it circumferentially to predetermined length and forming an endless scrap ring, said means including cooperating cutters one of which is an arcuate cutter blade sector mounted on said tool carrying wheel and extending radially beyond the periphery of the wheel, and
   (d) means for tearing the endless scrap ring and corrugating the ring by forming ridges and grooves which extend transversely of the severed scrap ring, said tearing and corrugating means including a toothed knurling sector mounted on said tool carrying wheel, the teeth of the sector extending parallel to the axis of the wheel and the can body, said sector being spaced circumferentially on the wheel from the cutter blade sector.

16. The can trimmer and scrap disposing mechanism defined by claim 15, in which the teeth on the knurling sector include a tooth which has a beveled edge inclined longitudinally of the tooth and tears the scrap ring transversely on contact with the ring.

References Cited

UNITED STATES PATENTS

| | | | |
|---|---|---|---|
| 2,119,942 | 6/1938 | Hessenbruch | 83—923 X |
| 3,033,264 | 5/1962 | Henrickson | 72—324 |
| 3,232,260 | 2/1966 | Siemonsen | 113—7 X |
| 3,270,544 | 9/1966 | Maeder et al. | |

CHARLES W. LANHAM, *Primary Examiner.*

E. SUTTON, *Assistant Examiner.*

U.S. Cl. X.R.

72—204, 294, 327, 328, 335, 339, 427